Nov. 6, 1923.

P. L. HILL 1,473,554

RECORDING APPARATUS

Original Filed Oct. 15, 1910    9 Sheets-Sheet 1

Nov. 6, 1923.

P. L. HILL

RECORDING APPARATUS

Original Filed Oct. 15, 1910  9 Sheets—Sheet 2

1,473,554

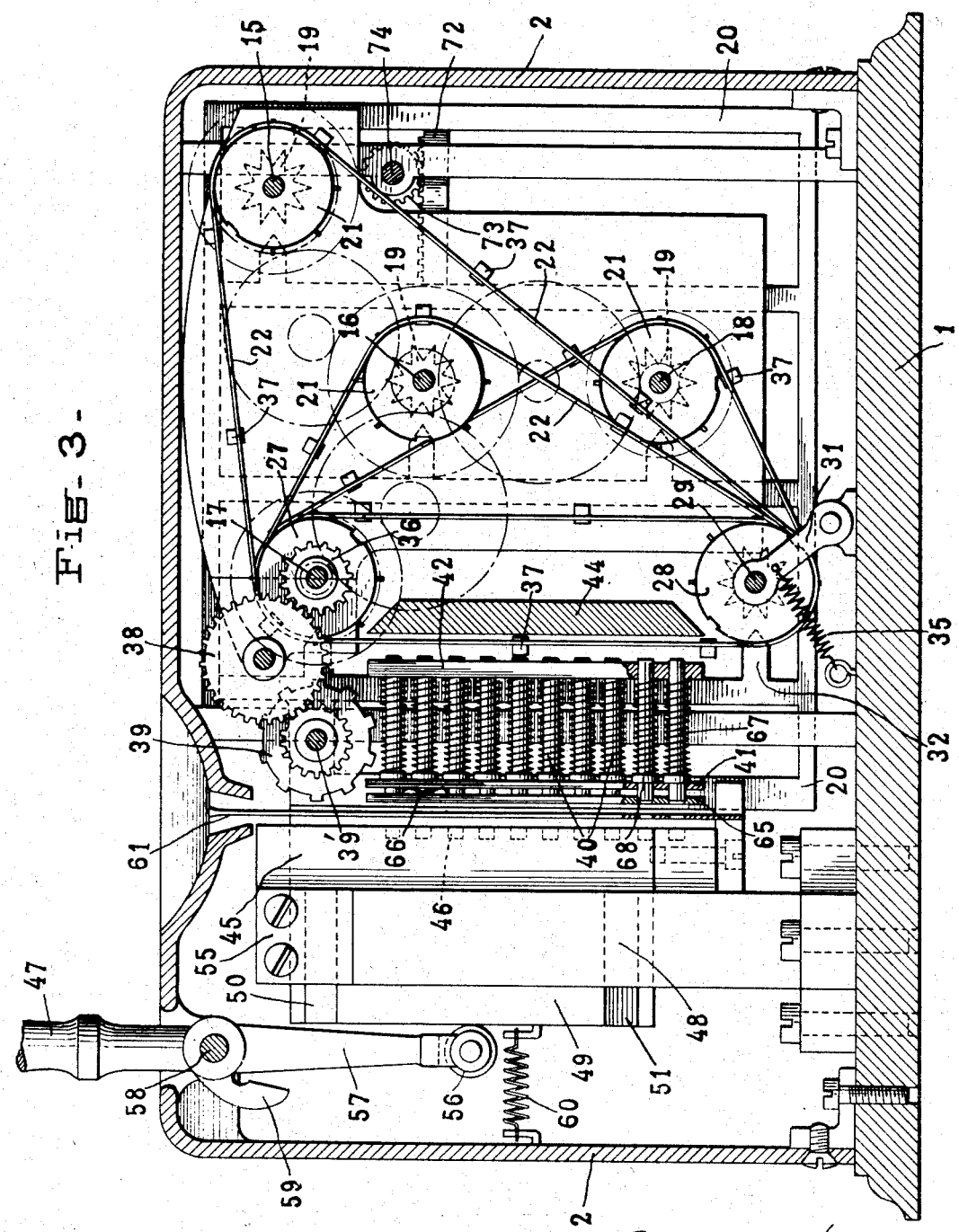

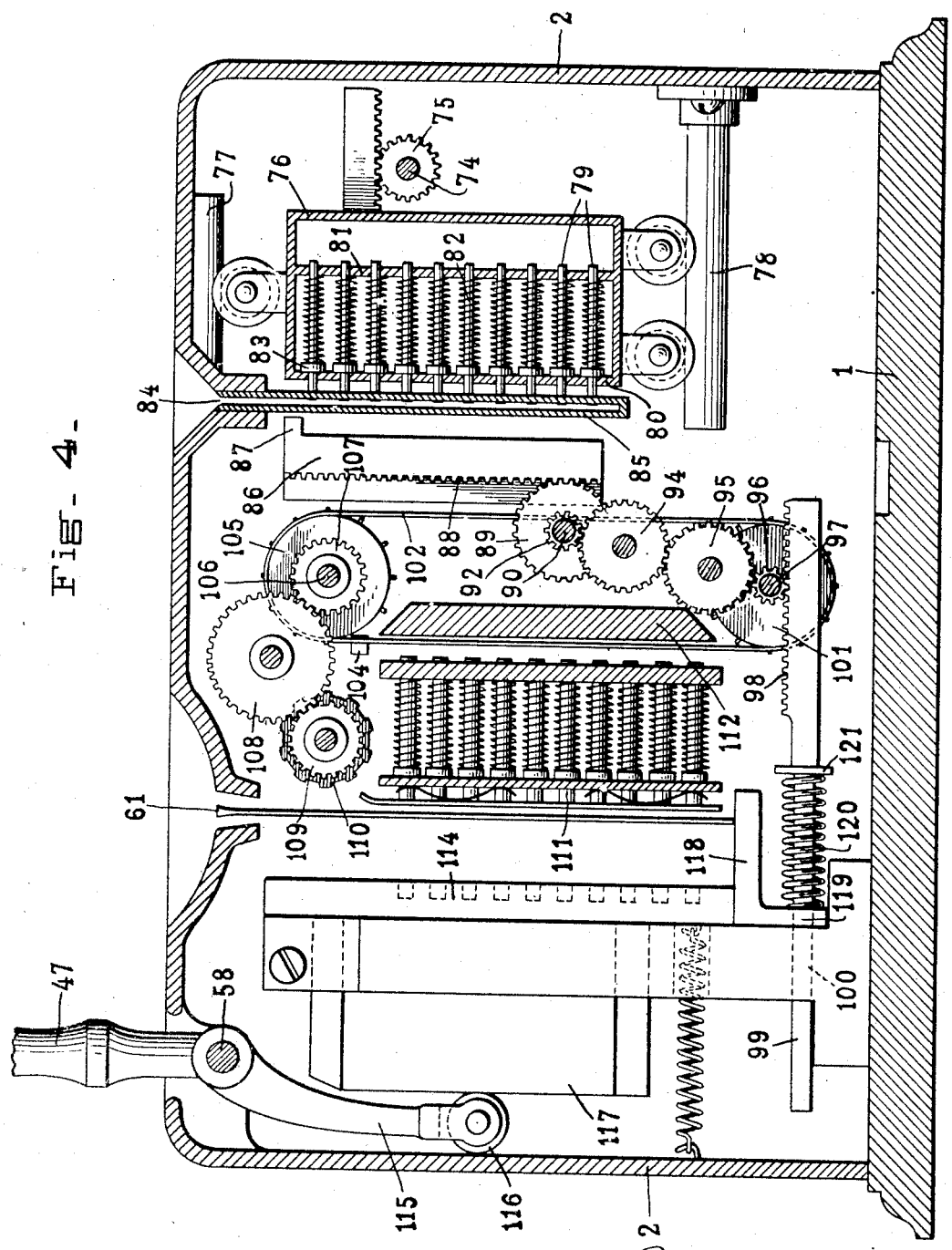

Nov. 6, 1923.

P. L. HILL

RECORDING APPARATUS 1,473,554

Original Filed Oct. 15, 1910    9 Sheets-Sheet 5

Nov. 6, 1923.
P. L. HILL
1,473,554
RECORDING APPARATUS
Original Filed Oct. 15, 1910    9 Sheets-Sheet 6
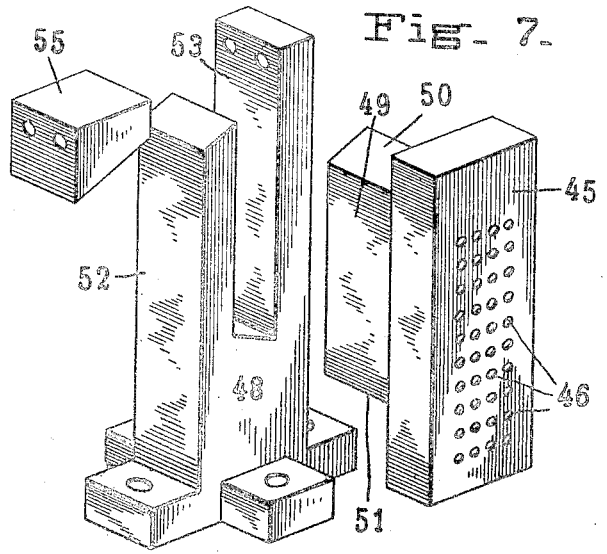
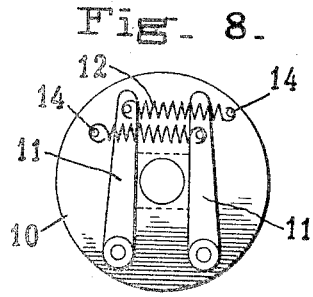
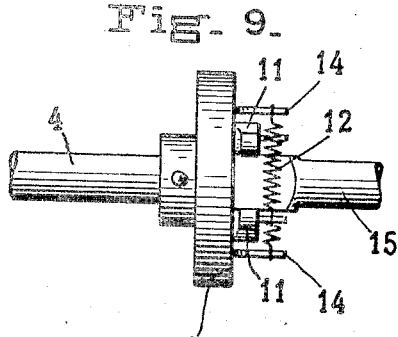
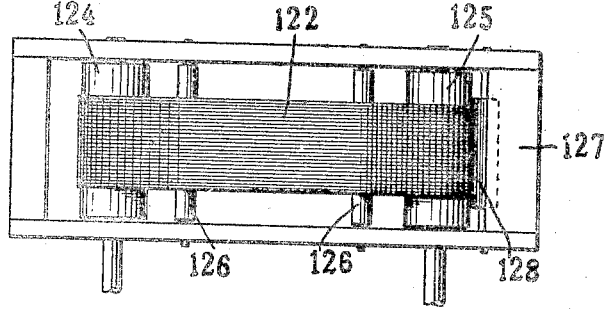
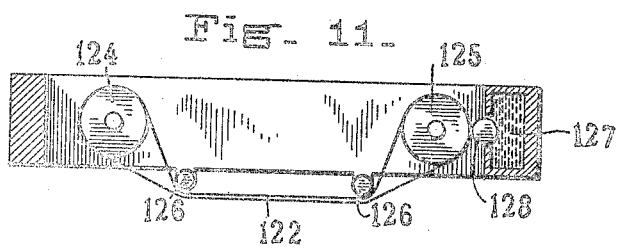
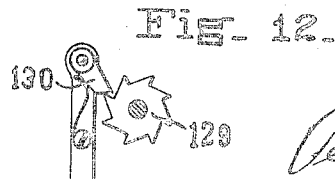

Nov. 6, 1923.

P. L. HILL 1,473,554

RECORDING APPARATUS

Original Filed Oct. 15, 1910    9 Sheets-Sheet 7

Fig. 13.

| John Smith, Wireman. | | | | | | | | | | |
|---|---|---|---|---|---|---|---|---|---|---|
| CLASS NO. | ORDER NO. | EMPLOYE'S PAY ROLL NO. | STARTED. | FINISHED. | ELAPSED TIME. | EMPLOYE'S RATE OF PAY. | WAGE COST | FIXED CHARGES. | TOTAL COST. |
| 0 0 | 0 0 0 0 | 0 0 0 0 | 0 0 0 0 | 0 0 0 0 | 0 0 0 0 | 0 0 0 0 | 0 0 0 0 | 0 0 0 0 | 0 0 0 0 |
| 1 1 | 1 1 1 1 | 1 1 1 1 | 1 1 1 1 | 1 1 1 1 | 1 1 1 1 | 1 1 1 1 | 1 1 1 1 | 1 1 1 1 | 1 1 1 1 |
| 2 2 | 2 2 2 2 | 2 2 2 2 | 2 2 2 2 | 2 2 2 2 | 2 2 2 2 | 2 2 2 2 | 2 2 2 2 | 2 2 2 2 | 2 2 2 2 |
| 3 3 | 3 3 3 3 | 3 3 3 3 | 3 3 3 3 | 3 3 3 3 | 3 3 3 3 | 3 3 3 3 | 3 3 3 3 | 3 3 3 3 | 3 3 3 3 |
| 4 4 | 4 4 4 4 | 4 4 4 4 | 4 4 4 4 | 4 4 4 4 | 4 4 4 4 | 4 4 4 4 | 4 4 4 4 | 4 4 4 4 | 4 4 4 4 |
| 5 5 | 5 5 5 5 | 5 5 5 5 | 5 5 5 5 | 5 5 5 5 | 5 5 5 5 | 5 5 5 5 | 5 5 5 5 | 5 5 5 5 | 5 5 5 5 |
| 6 6 | 6 6 6 6 | 6 6 6 6 | 6 6 6 6 | 6 6 6 6 | 6 6 6 6 | 6 6 6 6 | 6 6 6 6 | 6 6 6 6 | 6 6 6 6 |
| 7 7 | 7 7 7 7 | 7 7 7 7 | 7 7 7 7 | 7 7 7 7 | 7 7 7 7 | 7 7 7 7 | 7 7 7 7 | 7 7 7 7 | 7 7 7 7 |
| 8 8 | 8 8 8 8 | 8 8 8 8 | 8 8 8 8 | 8 8 8 8 | 8 8 8 8 | 8 8 8 8 | 8 8 8 8 | 8 8 8 8 | 8 8 8 8 |
| 9 9 | 9 9 9 9 | 9 8 9 9 | 9 9 9 9 | 9 9 9 9 | 9 9 9 9 | 9 9 9 9 | 9 9 9 9 | 9 9 9 9 | 9 9 9 9 |

Fig. 14.

| John Smith, Wireman. | | | | | | | | | | |
|---|---|---|---|---|---|---|---|---|---|---|
| CLASS NO. | ORDER NO. | EMPLOYE'S PAY ROLL NO. | 0 9:4 5 STARTED. | 1 2:3 0 FINISHED | ELAPSED TIME | EMPLOYE'S RATE OF PAY. | WAGE COST | FIXED CHARGES. | TOTAL COST. |
| 0 0 | 0 0 0 0 | 0 0 0 0 | ◯ 0 0 0 | 0 0 0 ◯ | 0 0 0 0 | 0 0 0 0 | 0 0 0 0 | 0 0 0 0 | 0 0 0 0 |
| 1 1 | 1 1 1 1 | 1 1 1 1 | 1 1 1 1 | ◯ 1 1 1 | 1 1 1 1 | 1 1 1 1 | 1 1 1 1 | 1 1 1 1 | 1 1 1 1 |
| 2 2 | 2 2 2 2 | 2 2 2 2 | 2 2 2 2 | 2 ◯ 2 2 | 2 2 2 2 | 2 2 2 2 | 2 2 2 2 | 2 2 2 2 | 2 2 2 2 |
| 3 3 | 3 3 3 3 | 3 3 3 3 | 3 3 3 3 | 3 3 ◯ 3 | 3 3 3 3 | 3 3 3 3 | 3 3 3 3 | 3 3 3 3 | 3 3 3 3 |
| 4 4 | 4 4 4 4 | 4 4 4 4 | 4 4 ◯ 4 | 4 4 4 4 | 4 4 4 4 | 4 4 4 4 | 4 4 4 4 | 4 4 4 4 | 4 4 4 4 |
| 5 5 | 5 5 5 5 | 5 5 5 5 | 5 5 5 ◯ | 5 5 5 5 | 5 5 5 5 | 5 5 5 5 | 5 5 5 5 | 5 5 5 5 | 5 5 5 5 |
| 6 6 | 6 6 6 6 | 6 6 6 6 | 6 6 6 6 | 6 6 6 6 | 6 6 6 6 | 6 6 6 6 | 6 6 6 6 | 6 6 6 6 | 6 6 6 6 |
| 7 7 | 7 7 7 7 | 7 7 7 7 | 7 7 7 7 | 7 7 7 7 | 7 7 7 7 | 7 7 7 7 | 7 7 7 7 | 7 7 7 7 | 7 7 7 7 |
| 8 8 | 8 8 8 8 | 8 8 8 8 | 8 8 8 8 | 8 8 8 8 | 8 8 8 8 | 8 8 8 8 | 8 8 8 8 | 8 8 8 8 | 8 8 8 8 |
| 9 9 | 9 9 9 9 | 9 9 9 9 | 9 ◯ 9 9 | 9 9 9 9 | 9 9 9 9 | 9 9 9 9 | 9 9 9 9 | 9 9 9 9 | 9 9 9 9 |

WITNESSES:

INVENTOR
Percy L. Hill

BY
Wilson
ATTORNEYS.

Nov. 6, 1923.
P. L. HILL
RECORDING APPARATUS
Original Filed Oct. 15, 1910  9 Sheets-Sheet 8
1,473,554
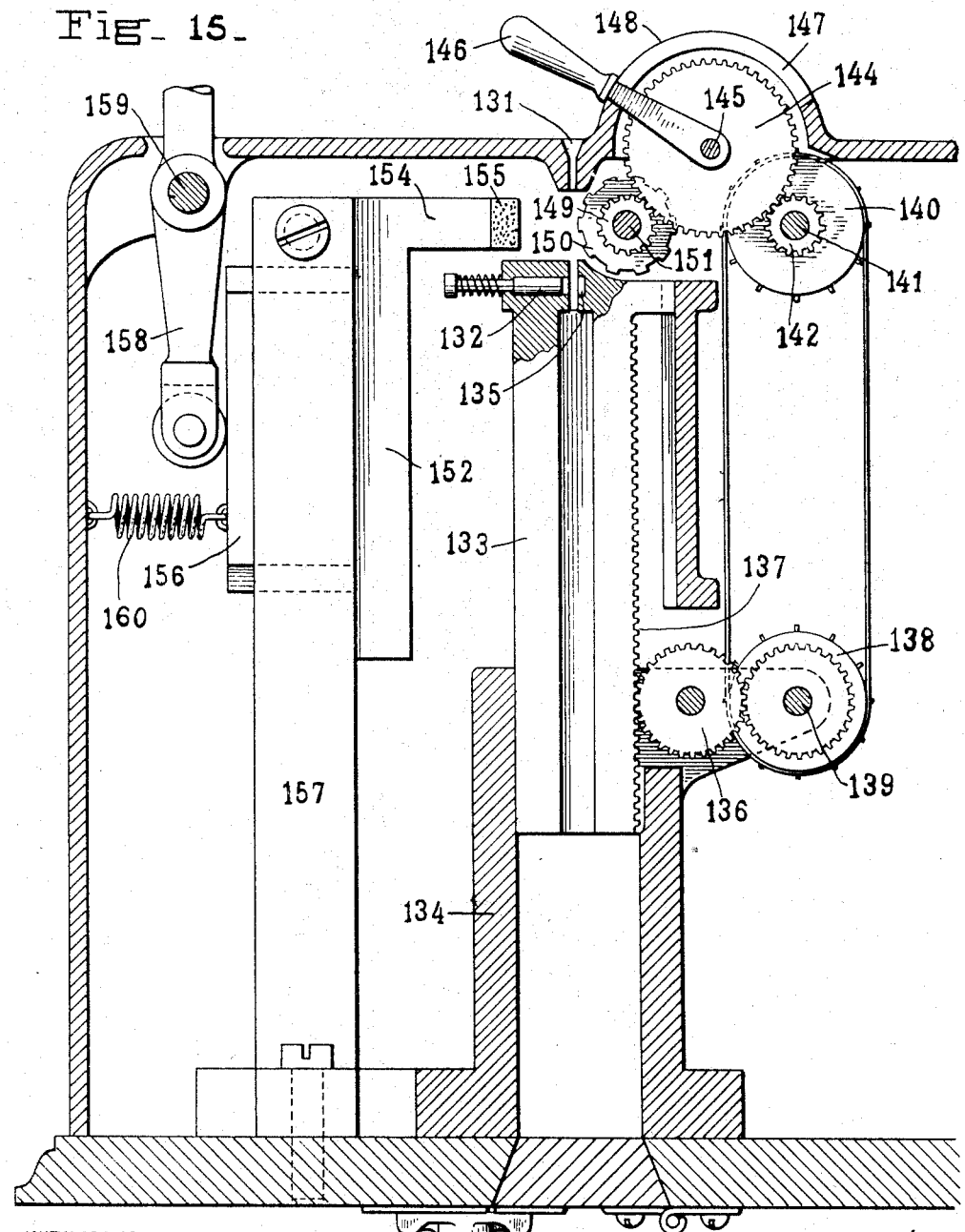

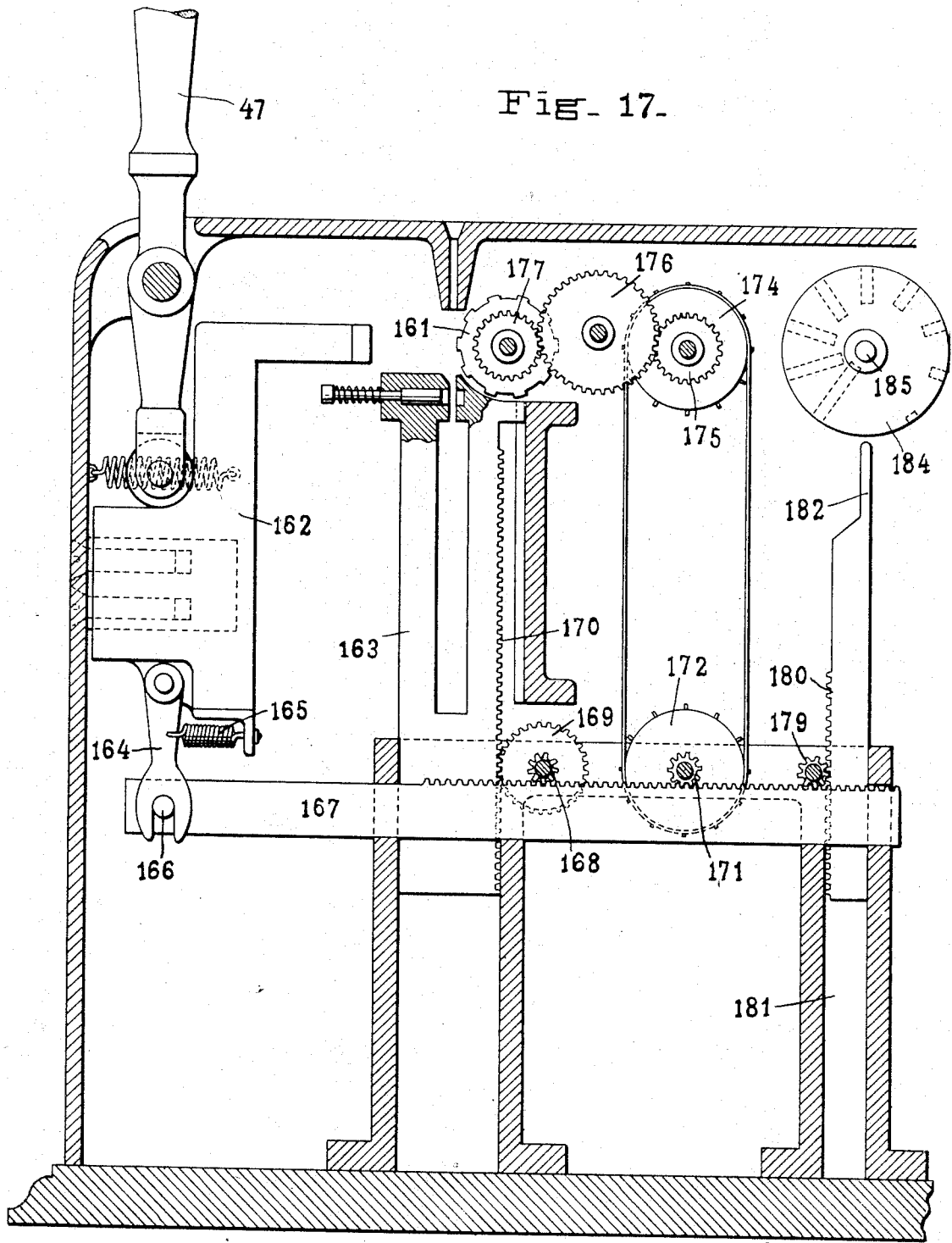

Patented Nov. 6, 1923.

1,473,554

UNITED STATES PATENT OFFICE.

PERCY L. HILL, OF NEW YORK, N. Y.; JAMES W. ANDERSON ADMINISTRATOR OF SAID HILL, DECEASED.

RECORDING APPARATUS.

Application filed October 15, 1910, Serial No. 430,998. Renewed December 15, 1920.

*To all whom it may concern:*

Be it known that I, PERCY L. HILL, residing at New York, in the county of New York and State of New York, have invented certain new and useful Improvements in Recording Apparatus, of which the following is a specification.

This invention relates to recording machines of the kind in which a record is made in or upon a card or the like. An object of the invention is to provide a recording machine which is adapted simultaneously to change the physical characteristics of the card or the like in two different ways, in the present instance by printing upon and perforating the same.

Another object of the invention is to provide a recording machine whereby a card or the like may be perforated or punched to make a record and whereby the card may be simultaneously printed upon in order to produce a printed record to the same effect as the record produced by punching.

Still another object is to provide a recording machine in which there are time-controlled means for producing in or upon a card a record, and having means whose operation is selectively determined for producing in or upon the card another record.

Another object is to provide a machine attaining the object last set forth, whereby records to the same effect are made upon the card by different methods, in the present embodiment by printing and perforating.

Another object is to provide a recording machine adapted to receive a card or the like and including selectively operated means for producing a record in or upon the card in accordance with a record carried by a master-card.

Other objects, relating to the broad aspects of the invention, and objects relating to the construction and operation of certain details, will be in part obvious and in part specifically referred to in the course of the following description of the elements, combinations, arrangements of parts, and applications of principles, constituting the invention, and the scope of the application thereof will be indicated in the annexed claims.

In the accompanying drawings, which are to be taken as a part of this specification, and in which we have shown merely preferred forms of embodiment of my invention, and of the parts thereof;

Figure 3 is a section on the line 3—3 of Figure 2;

Figure 4 is a section on the line 4—4 of Figure 2;

Figure 7 is a detail of the die carriage cooperating with the time-controlled mechanism;

Figure 8 is a detail of a disk secured to certain driven shafts of the clock-work and forming part of the justifying mechanism included in the time-controlled means;

Figure 9 is a detail showing the subject-matter of Figure 8, as operatively applied in the machine;

Figure 10 is a detail of the inking device for the printing mechanism;

Figure 11 is a view taken at right angles to that of Figure 10;

Figure 12 is a detail of the feeding device for the inking mechanism shown in Figures 10 and 11;

Figure 13 illustrates a card which is adapted to be used in machines embodying my invention, the same being blank;

Figure 14 is a view of the same card, after it has been acted upon by the time-controlled mechanism, two different approximate moments of time being indicated thereon by printing and perforations;

Figure 15 is a sectional view, broken away, illustrating a modified form of selectively controlled punch which may be used in connection with the rest of my invention;

Figure 16 is a detail of the selector employed in connection with the device shown in Figure 15; and Figure 17 is a view in sectional elevation, partly broken away, of still another form of selectively controlled, or time controlled, printing and perforating means.

I shall first describe the time controlled mechanism which forms part of a complete device embodying my invention.

Figure 1:
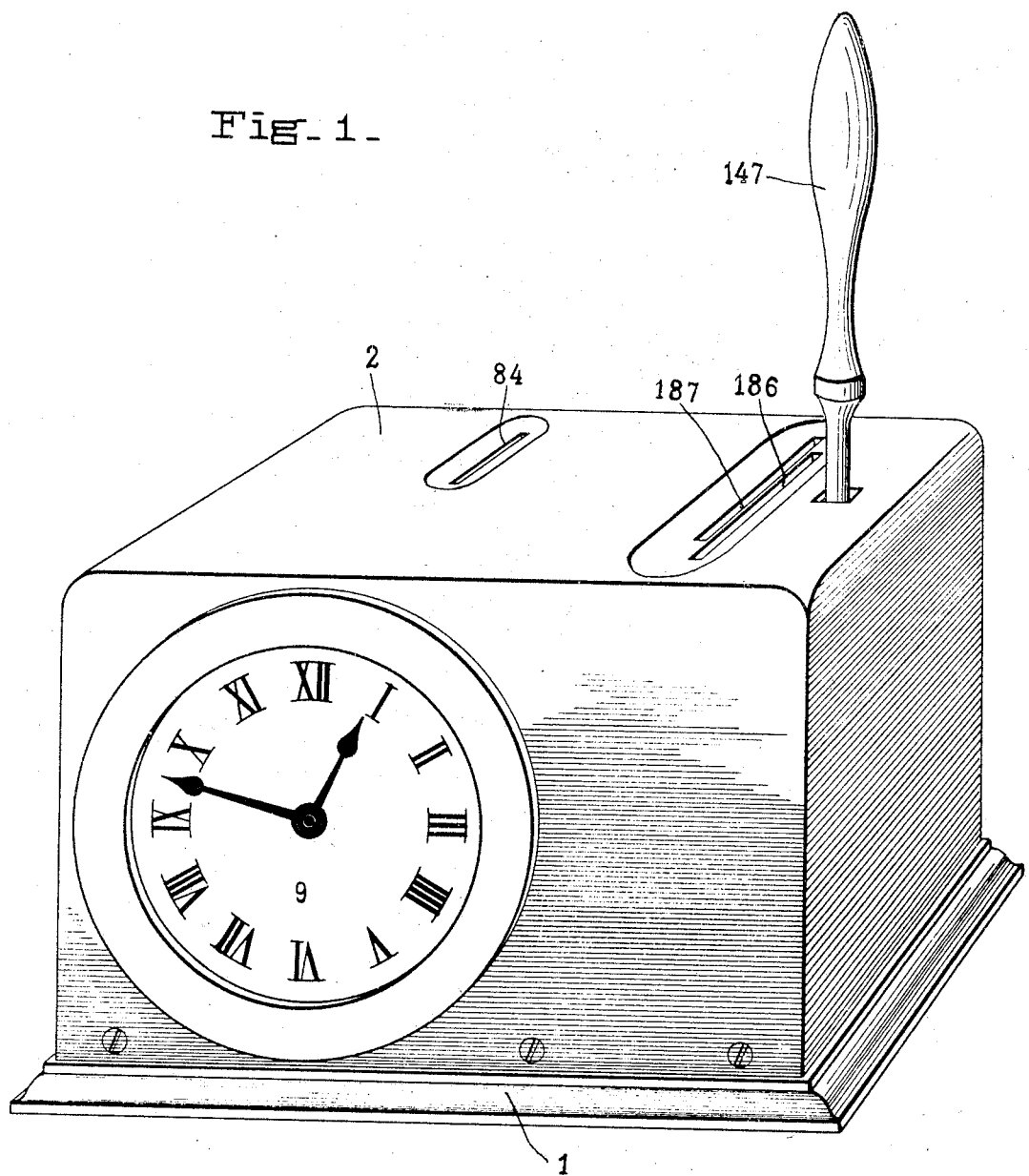
Figure 1 is a perspective of a device including my invention.
Figure 2:
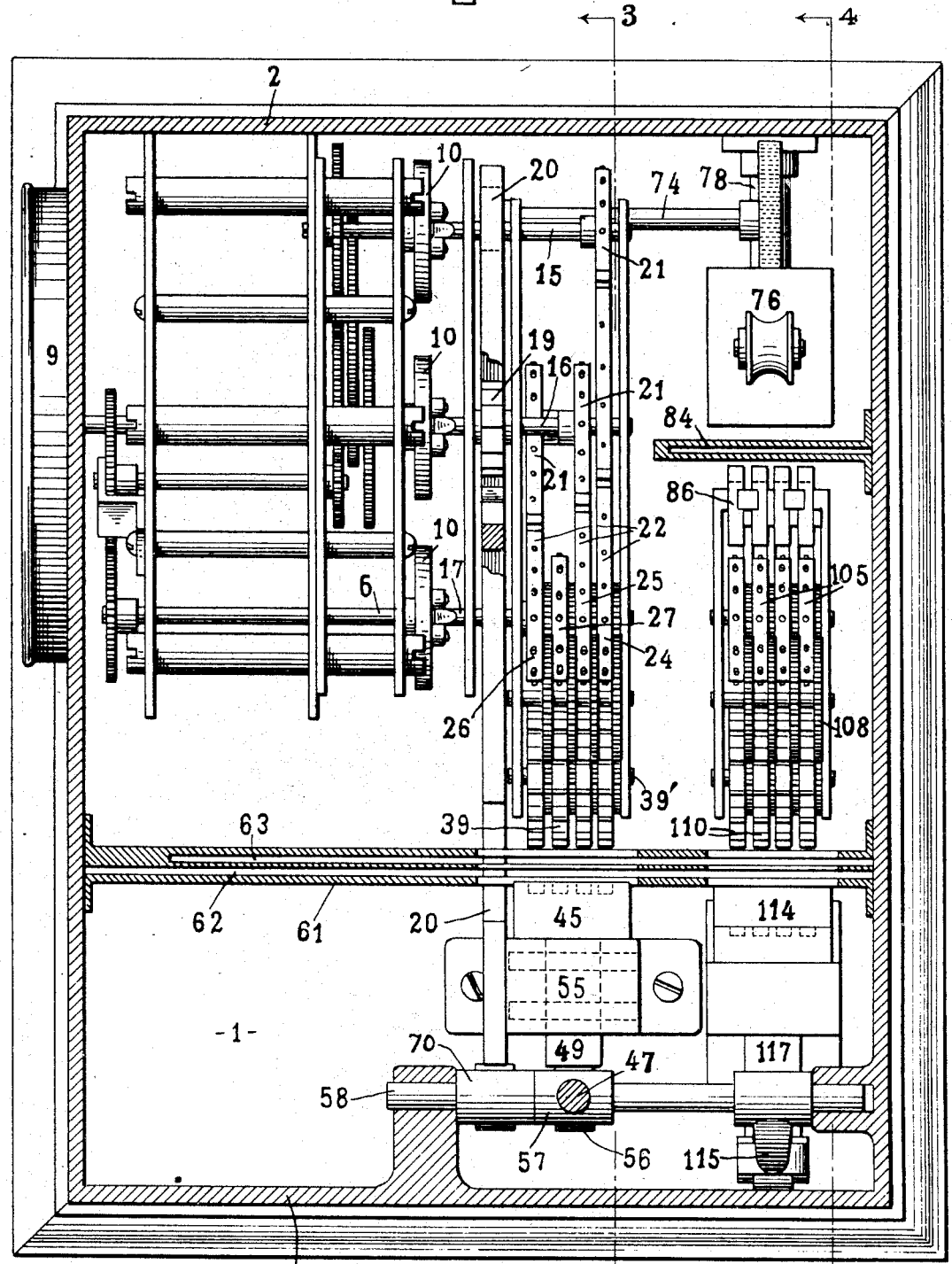
Figure 2 is a top plan view of the subject-matter of Figure 1, with the top of the casing removed.
Figure 6:
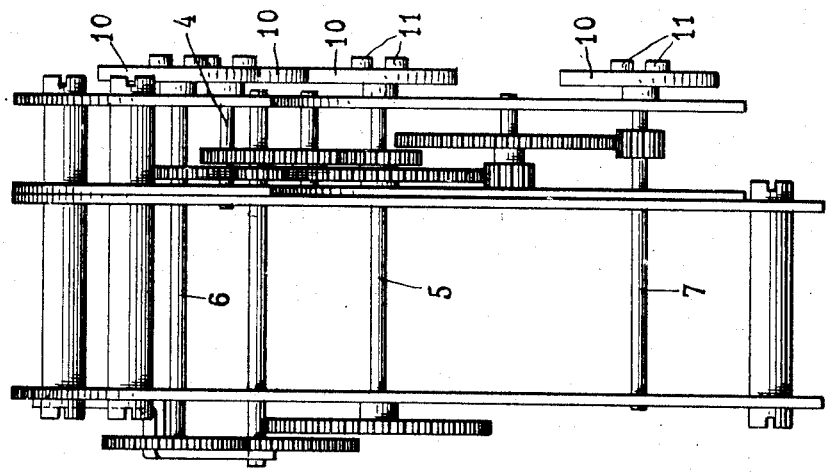
Figure 6 is a detail of the clock-work.
Figure 5:
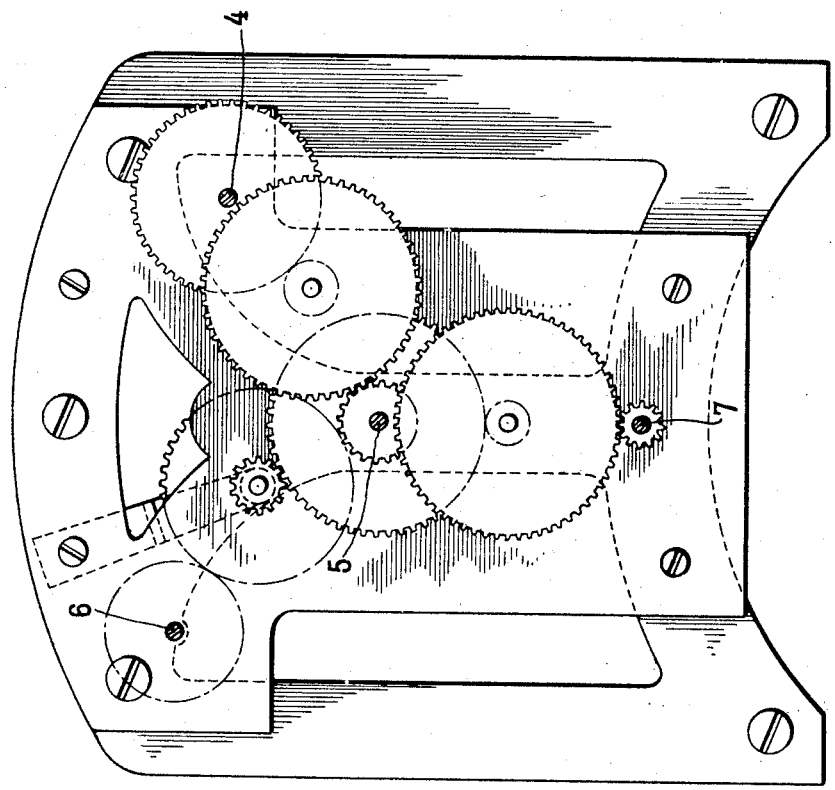
Figure 5 is a detail of the time-controlled wheels.

Referring to the numerals on the drawings, 1 indicates a base, upon which the rest of the mechanism is mounted, and 2 indicates a casing for enclosing the mechanism. Suitably supported within the casing is a clock-work, illustrated in Figure 6, which in a well known manner drives the four shafts, indicated by numerals 4, 5, 6, and 7, the shaft 4 making a complete revolution once in 10 hours, shaft 5, once in one hour, shaft 6, once in 10 minutes, and shaft 7, once per minute. The clock-work is provided with a dial 9, which is visible at the side of the casing, as shown in Figure 1. The shafts 4, 5, 6, and 7, are geared together in such a way that the ratio of their revolutions as above set forth is maintained, and upon the outer end of each one of these shafts is fast a disk 10, which carries upon its outer face a pair of pivoted arms 11, Fig. 8, disposed in parallel relation, and urged towards each other by means of retractile springs 12, the lugs 14 upon the disks to which the springs are attached acting also as stops to limit the pivotal movement of arms 11 away from each other. Alined with the shafts 4, 5, 6, and 7, respectively, are shafts 15, 16, 17, and 18, having squared ends Fig. 9 that are embraced between the arms 11 upon the disks 10 belonging to the respective shafts 4, 5, 6, and 7, so that when these driving shafts 4, 5, 6, and 7, are rotated in the operation of the clock work, clutch connection is established between shafts 4 and 15, 5 and 16, 6 and 17, 7 and 18, so that the shafts 15, 16, 17, and 18, may be rotated ahead of or retarded with respect to the rotation of their respective shafts 4, 5, 6, and 7, though normally the shafts 15, 16, 17, and 18, rotate only as their corresponding shafts 4, 5, 6, and 7, rotate.

On each one of the secondary shafts 15, 16, 17, and 18, and located at about the middle portion thereof, respectively, is mounted a justifying device 19, comprising a toothed wheel, the teeth of which are separated by V-shaped recesses, with which are adapted to engage correspondingly shaped fingers carried by a reciprocating carriage 20, presently to be described. It will be understood that as the fingers upon the carriage 20, are moved into engagement with the respective justifying wheels 19, the said wheels are moved either backward or forward, according as the points of the fingers engage one wall or the other of the recesses in the wheels 19. The clutch connection between the secondary shafts 15, 16, 17, and 18, and shafts 4, 5, 6, and 7, respectively, permits such relative movements, as will be understood. The purpose of these arrangements is to justify the printing wheels and punch anvils, as will be presently described.

Each one of the shafts 15, 16, and 18, which is suitably journaled in a proper frame within the casing, is provided with a sprocket wheel 21, over which passes a perforated steel belt 22. Shaft 17, which is clutched to the ten-minute shaft 6 of the clock-work, is provided with four sprocket wheels, 24, 25, 26, and 27, wheels 24, 25, and 26, being loose upon the shaft, and the wheel 27 fast thereon. The belt that passes over sprocket wheel of shaft 15 passes also over the sprocket wheel 24; the belt which passes over the sprocket wheel of shaft 16 passes also over the sprocket wheel 25; and the belt which passes over the sprocket wheel of shaft 18 passes over sprocket wheel 26.

Each one of these belts also passes over an appropriate alined sprocket wheel 28, which is carried upon a shaft 29, that is supported in a spring tensioned bearing 31, in the lower part of the casing, said shaft 29, being provided also with a justifying wheel 19, which engages a finger 32 on the movable carriage, already referred to.

A belt similar to those already described passes over the sprocket wheel 27, fast on the shaft 17, and thence over an appropriate sprocket wheel upon the shaft 29. The shaft 29 is held under tension to maintain all of the various driving belts in taut condition, as by means of the coiled retractile springs 35, one end of each of which is attached to the casing and the other ends to the outer ends of the pivoted arms 31, in which the shaft has bearing. Each one of the various bands or belts heretofore referred to carries a plurality of suitably spaced anvils 37, which are fixed to said belts and project from the outer faces thereof. The anvils also project slightly beyond the inner faces of the steel belts, to engage corresponding peripheral recesses in the sprocket wheels over which the belts pass. The shaft 17, which is the tens-of-minutes secondary shaft, is provided with a gear 36 fast to sprocket 27 that drives an idler 38, which in turn drives a tens-of-minutes printing wheel 39 that is rotatable upon printing wheel shaft 39'.

It will be observed that the gears through which the sprocket 27 drives the printing wheel 39 are so disposed that the said sprocket is in peripheral alinement with the printing wheel. The periphery of this printing wheel is provided with type characters, which in the present instance run from 0 to 9.

Similar wheels for printing minutes, hours, and tens-of-hours, are mounted upon the printing wheel shaft 39', and are driven respectively through intermediate idlers meshing with gears that are rigid with the respective sprocket wheels 24, 25, and 26, the arrangement of parts being similar to that described with reference to the tens-of-minutes printing wheel. It will be evident that because of the clutch connections between shafts 4, 5, 6, and 7, and 15, 16, 17, and 18, respectively, when the various justifying wheels 19 are engaged simultaneously by the justifying fingers 32 on carriage 20, the printing wheels upon the shaft 39' may all be brought to square printing position, it being understood, of course, that the parts are all properly disposed to the accomplishment of this end.

Referring now to the time-controlled means for punching the card, the mechanism already described forms a part of the punching means in so far as concerns the various driving belts, with the anvils which they carry, and the justifying arrangement.

Arranged below the printing wheels and in vertical rows corresponding to and vertically alined with the printing wheels, and therefore in alinement with the several belts through which the printing wheels are driven, are punching means, each comprising ten punches 40 in superposed vertical relation, the ten punches of each of the four series having capacity for reciprocatory movement, between their front and rear supporting plates, 41 and 42, respectively. Movement in one direction (to the right in Figure 3) is prevented whenever the belt that is alined with a particular series of punches, is in a position where one of the anvils which it carries is between the given punch and a fixed abutment 44, it being understood that the anvils are so arranged upon the respective belts that only one anvil at a time is presented between abutment 44 and one of the rows of punches, the punch of a given vertical row with which the anvil has cooperative relation being determined, as will be readily understood, by the movement of the particular driving shaft which actuates that belt.

Keeping in mind this relation between the punches and the driving belts, and therefore between the punches and printing wheels, it will be understood that the parts are readily arranged so that when a given printing character of one of the printing wheels is in operative position, a predetermined punch of the vertical row of punches corresponding to that printing wheel will be operative because of the presence of an anvil behind it. It will also be understood that as the printing character on a given printing wheel is brought to square printing position by the justifying means, the anvil of the belt corresponding to that printing wheel, and which determines the operativeness of the punch corresponding to the printing character will be brought squarely behind the said punch, because of the strictly coordinated movements of belts and printing wheels.

A die member 45 having four vertical rows of ten holes 46, corresponding to the punches 40, is movable towards the punches, as by movement of the lever 47, the die member being slidably supported in the guide way 48 secured to the base. The die member 45 has an extension 49 that is provided with upper and lower oppositely beveled surfaces 50 and 51, the lower face 51 engaging with a corresponding bottom surface between the arms 52 and 53 of the guide member 48. The arm 52 of the guide member is shorter than the other arm, and its upper end is beveled upwardly towards arm 53. A piece 55, beveled to correspond with the bevel at the top of arm 52, is adapted to rest upon the top of arm 52 and abut against arm 53. A screw is passed through the piece 55 and into the face of arm 53, and it will be evident that as the screw is tightened and piece 55 rides up the bevel of arm 52, the contact of the lower face of the piece 55 with the bevel on the die extension will hold the latter in desired proper relation in the guide.

A roller 56 at the end of an arm 57 loosely pivoted upon shaft 58 contacts with the rear end of die extension 49, and this arm is moved towards said extension by a short arm 59 fast on shaft 58, said shaft being rocked upon manipulation of operating handle 47.

Return of the die member to the normal position (Figure 3) is caused as by means of retractile spring 60, which connects the die extension 49 with a fixed part of the machine.

A member 61 extends across the machine between the punches and the dies, and is provided with parallel slots 62, 63, transversely of the machine, and which have openings in their walls to permit of movement of the die member therethrough. If a card is inserted in one of the slots so that it extends between the punch and the die, and the operating handle is moved so as to move the die towards the punches, it will be evident that the card will be perforated by that one of the punches in a given vertical row whose movement away from the die is prevented by the presence of an anvil behind it. At the same time the upper end of the card is forced against the predeterminedly opposed printing character of the printing wheel that corresponds and is in alinement with that particular vertical row of punches, and a printed record made on the card, as hereafter set forth. It should be remembered, also, that at every operation some one (and only one) punch in each vertical row is operative, and each printing wheel, likewise, acts upon the card.

A stripper-plate 65 has apertures fitting the punches 40, and is normally held spaced a little distance from the front plate 41, through which the punches are movable, as by means of leaf springs 66. When the die 45 is moved towards the punches the stripper-plate is moved towards the front-plate 41 of the punch-frame, against the force of springs 66. After the punches have cooperated with the die member 45, as described, and the die member, upon release of the operating handle 47 is returned to normal by the retractile spring 60, the punches all return to their position of Figure 3, under the force exerted by the springs 67 between the inner wall 42 of the punch-frame and the collars 68 on the outer ends of the punches; and the springs 66 between the front plate of the punch-frame and the stripper-plate throw the latter away from the former, effectually preventing any sticking of the card to a punch. The outward limit of movement of the stripper-plate with respect to the punch-frame is about as shown in Figure 3, so that when the parts are in normal relation the stripper plate extends slightly beyond the ends of the punches which pass through it.

The reciprocating carriage which constitutes part of the justifying means already referred to comprises a frame 20, which is cut out wherever it is crossed by the various shafts or other parts described. It has a part that extends under the card receiving member 61, and thence into operative proximity to an operating arm 70 mounted upon the shaft 58. This operating arm preferably acts upon the carriage before the arm 57 moves the die member 45, so that the anvils are brought into proper position with relation to the punches, and the corresponding printing wheels in proper printing position, this justifying being accomplished by the engagement of fingers 32, located at proper points on the carriage frame, with the justifying wheels on the shafts 15, 16, 17, 18, and 29, as already described. The carriage is suitably supported and guided so that straight line movement may be assured.

I will now proceed to explain the construction of the selectively controlled recording means, and its relation to the time controlled means.

At the rear end of the movable carriage there is a rack extension 72, that engages with a pinion 73, fast upon one end of a shaft 74 that is suitably journaled in the machine frame, said rack extension working underneath said pinion. The other end of shaft 74 carries another pinion 75 fast thereon, and this pinion 75 underlies and engages with a rack extension of a selector frame 76. Selector-frame 76 is provided with grooved wheels above and below, adapted to travel over tracks 77 and 78, supported upon the machine frame, there being preferably one wheel above and two beneath, to prevent binding. It will be evident that upon movement of carriage 20 in its justifying operation the selector frame will be moved in the opposite direction. This is for a purpose presently to be explained.

The selector frame 76 carries four vertical rows of ten selectors 79, slidable in alined apertures in front and rear plates 80 and 81, respectively, and normally urged to extend through the front plate as by means of coil springs 82 surrounding them and bearing between the rear plate and collars 83 on the selectors, said collars abutting the inner face of the front plate and limiting the outward movement of the selectors.

84 indicates a master-card receiving member fixed in the path of movement of the selector frame, and having the walls of its slot provided with alined perforations in line with the respective selectors. In the normal position of the parts (Figure 4) the selectors extend barely through the adjacent wall of master-card receiving member 84, and it is evident that upon movement of the selector frame to the left in Figure 4, all of the selectors 79 will penetrate the apertures in the opposite wall of member 84, provided nothing is interposed between said walls to hinder the movement of the selectors. In this event it is contemplated that the selectors will project beyond the wall 85 of member 84. If, however, I place a card in member 84, having perforations therein located opposite certain of the selectors 79 in the different vertical rows of the latter, it is evident that those selectors will pass through the card and the wall 85 of the member 84, while the other selectors will, in the movement of the selector frame, be driven back by the imperforate portions of the card against the force of their springs 82. In practice the master card may have four perforations, in vertical non-alinement, horizontally spaced apart to correspond with the horizontal spacing of the vertical rows of selectors. Consequently, in the operation of the machine, one selector of each vertical row will project through wall 85, the position of the card perforation corresponding to a given vertical row of selectors determining which one of the selectors of that row will project, it being understood that I do not contemplate the use of a card which will cause the projection of more than one (though always one), of a given vertical row of selectors.

Referring again to Figure 4, I show certain mechanism whose operation is controlled by the selectors 79, as affected by the master-card. Corresponding to and in alinement with each of the vertical rows of selectors is a vertically movable member 86, slidable in proper bearings in the machine frame, and having at its upper end a projection 87, which approaches the wall 85 of card receiving member 84 so nearly that it catches over any selector 79 of the vertical row of selectors to which it is related that may be projecting beyond wall 85. Each sliding member 86 is provided with a rack 88 that engages a pinion 89 on a shaft 90 suitably journaled in the machine frame.

Rotation of shaft 90, and consequent movement of sliding member 86, is effected through rotation of a shaft 91, through the intermediary of pinion 92, idlers 94 and 95, and pinion 96, fast on shaft 97. This pinion 96 in each case is driven by a rack extension 98 of a bar 99 that is normally reciprocatory in a bearing 100.

A series of sprocket wheels 101, corresponding to the vertical rows of selectors 79, and to the number of rack bars 88, is fast upon shaft 97, and over these sprocket wheels run steel belts 102, each carrying an anvil 104 that projects from the outer face of the belt, each belt passing also around a sprocket wheel 105 upon a shaft 106 suitably journaled in the frame. Secured to each of these sprocket wheels 105 is a pinion 107, which, through an intermediate idler 108 and pinion 109, drives a printing wheel 110. It should be stated that the courses of the sprocket belts are preferably vertical, and in front of each belt and below its printing wheel, is a vertical row of punches 111, corresponding in number to the number of selectors 79 in the corresponding vertical row of selectors. The several vertical rows of punches are arranged, constructed, and supported preferably in the same way as the punches for the time controlled mechanism, already described, and the forward courses of the sprocket belts run between the inner ends of the respective rows of punches and a fixed abutment 112, as and for the same purpose already explained with reference to similar parts of the time controlled mechanism.

Cooperative with the punches 111 is a die member 114, whose construction and operation is substantially like that of the similar member described in connection with the time controlled mechanism. This movable die member is operated by means of an arm 115 fast on shaft 58, which contacts, through a roller 116, with the die extension 117. The die and punches are upon opposite sides of the card receiving member 84, which is provided with an opening through its walls for the passage of the die.

Upon movement of the die towards the punches 111, movement is also given to each of the bars 99 in the same direction through a piece 118 fast on the die 114 and having a portion 119 through which the bar extends. A coil spring 120 surrounds each bar 99 and is compressed between the portion 119 and a collar 121 on the bar, said spring being of sufficient strength, so that normally each bar and the piece are in effect one piece, so far as movement to the right in Figure 4 is concerned. But if there is any interference with this forward movement of any of the rack bars 99, the piece 119 continues to move forward independently of that bar, simply compressing the spring of the latter. It will be obvious that such interference with the forward movement of a bar 99 will affect the movements of the sprocket wheels and belt corresponding to that particular bar, and will also control the position of the anvil carried by that belt, thereby determining the coordinated operation of the punches and printing wheels 110, as will be plain from preceding description.

This interference is effected for each rack bar 99 by the particular one of the selectors 79 appropriated to that rack bar which is allowed to project through the wall 85, the perforations of the master-card in card receiving member 84 determining this factor. Obviously, the contact of member 87 with any one of the selectors opposed to it will prevent further forward movement of the corresponding rack bar 99, thereby determining the coordinated operations of the punches 111 and printing wheels 110. The normal position of the parts is shown in Figure 4, and if no master card is in place, it is clear that they will remain in this position, no punching will take place, and the wheels will print 0, that character being normally in printing position. It is evident also that because of the strict coordination subsisting between selectors 79, punches 111, and printing wheels 110, a master-card (meaning, of course, one intended for use with this machine) having certain perforation characteristics, will produce always corresponding perforation and printed characteristics upon a record card properly adapted for the machine.

The inking device for the time and selectively controlled printing wheels is shown in Figures 10 and 11, and comprises an endless ribbon 122, which passes over rollers 124 and 125, mounted in the machine frame, and both courses of this ribbon are led over guides 126, so that between these guides the courses of the ribbon run face to face. At one side of one of the rollers 125 is an ink reservoir 127, from which ink is transferred to the ribbon as by means of a friction roller 128 which projects slightly within the reservoir and has frictional engagement with the ribbon. The inking device is arranged in the machine so that the ribbon is presented between the printing wheels of the time control and selectively controlled mechanisms and a card which may be within the slots appropriated to said mechanisms. The ribbon is intermittently moved over its rollers 124, 125, and new surfaces presented to the printing wheels and ink applied from the reservoir to the ribbon, as by means of some simple device for rotating one of the rollers step-by-step. I have shown such a device in Figure 12, in which a ratchet wheel 129 is fast on the shaft of one of the rollers and is intermittently engaged by a pawl 130 that is connected to a moving part of the machine.

In Figures 15, 16, and 17, I have shown modified forms of the selectively controlled printing and punching means. In Figure 15 the casing is shown as provided with a slot 131 in which a card is received, the card being suitably held in vertical position. In order to determine at what particular vertical point on the card a punch mark shall be made, I provide a single punch 132, which is carried in a sliding member 133 which reciprocates vertically in a hollow guide member 134 secured to the base. This sliding member 133 is slotted through a portion of its extent in alinement with the card slot, so that the card as it is inserted in the slot 131 will pass down into the slot of the sliding member. The punch 132 is carried in the sliding member at one side of said slot, and the die 135 corresponding to said punch is formed in the other wall of said slot. It will be apparent that, the card being held stationary, if the sliding member carrying the punch is moved vertically, the punch may be caused to operate at different vertical points on the card, if means are provided for driving the punch 132 into the die 135. The means for determining the vertical position of the sliding member 133, and therefore of the punch 132, comprises a gear 136 which engages a rack 137 formed upon the sliding member 133, so that upon rotation of the gear the sliding member is moved up or down. The said gear 136 engages another gear which is secured to a sprocket wheel 138 that is rotatable upon a shaft 139. A perforated steel belt passes over the sprocket wheel 138 and over another sprocket wheel 140 upon a shaft 141, and a gear 142 secured to said sprocket wheel 140 engages a main gear wheel 144 which is mounted near the top of the casing upon a shaft 145. An operating handle 146 is secured to said shaft 145 and extends through a slot 147 in an arc-shaped cover member 148, guiding indicia being provided adjacent the slot 147. The main gear 144 also engages with a gear 149 secured to a printing wheel 150 that is mounted upon a shaft 151, so that the said printing wheel is adjacent a card when the latter is in position in its slot 131. A means for driving the punch 132 into the die 135 comprises a member 152 adapted to contact with the punch, and having an extension 154 provided with a pad 155 adapted to force a card against the printing wheel 150 at the same time that the punch is being forced into the die. The member 152 is provided with an extension 156 that is slidable in a guide member 157 secured to the base, and movement of said member 152 is brought about by means of an arm 158 pivoted upon a shaft 159, having a roller bearing against the member 152. The member 152 is returned to or normally retained in the position of Figure 15 as by means of a spring 160 stretched between it and the adjacent casing. The parts described are so arranged that, supposing a card is adapted to be punched in any one of 10 alined vertical points, if the handle 146 is set so that it corresponds with the index number "3" shown in Figure 16, the movements of the printing wheel and of the sliding member 133 induced by the movement of said handle will be such that the printing character "3" upon the printing wheel will be presented to the card, and the sliding member 133 will be in such position that the punch will be opposite the fourth vertical point in the given vertical row of points on the car that is alined with the punch. (See Figure 13). Now, when the lever 158 is operated to move the member 152 towards the punch and printing wheel, the fourth vertical point of the vertical row of points on the card will be punched and the character "3" will be printed on the upper end of the card above said vertical row. Some suitable inking device for the printing wheel would of course need be provided.

An arrangement like that just described is useful where it is the desire to punch a card without regard to time controlled means or means controlled by a master-card.

Another variation of this means is shown in Figure 17. This may be employed as a variation of the clock controlled means for recording points of time. In this embodiment there is a sliding slotted punch support similar to that shown in Figure 15, and above the same there is a printing wheel 161; with the punch and printing wheel co-operates a member 162, similar to the member 152 of Figure 15, which is moved by lever and spring retracted, as is the case with member 152 in Figure 15. At its lower end the member 162 is provided with a link 164 pivoted thereto and normally held towards member 162 by means of a spring 165. The outer end of this link is bifurcated and engages over a bearing lug 166 on a rack-bar 167. This rack-bar engages with a pinion 168 fast to a gear 169 which drives the rack 170 of sliding member 163 to bring the punch to desired vertical position with respect to a card. The rack-bar 167 also engages a pinion 171 fast to a sprocket wheel 172, over which runs a perforated steel belt engaging a sprocket wheel 174 which, through intermediate pinion 175, gear 176, and pinion 177 fast on printing wheel 161, rotates said printing wheel in accordance with the movements of rack-bar 167. Said rack-bar also engages a pinion 179, with which is engaged by a rack-bar 180 that is slidable in a guide 181 at right angles to the path of movement of the rack-bar 167. The upper end of said rack-bar 180 is provided with a finger 182, which is adapted to enter any one of a plurality of radial apertures in a disk 184 that is rotatable upon a shaft 185. The rotation of this disk upon its shaft is controlled manually from the outside of the machine by reference to some suitable guiding indicia adjacent to the controlling means, or by the movement of clock mechanism through a clutch connected shaft, as previously described. It will be evident that finger 182 of rack-bar 180, upon actuation of the rack-bar 167, may move upwardly a definite distance, determined by the depth of the aperture of the disk which is opposed to the finger. If the recess is deep the rack-bar will travel a corresponding distance, and the printing wheel will be rotated a corresponding amount and the punch will be lowered accordingly. When the finger reaches the bottom of the recess which it has entered, further movement of the member 162 by means of the actuating lever will result in operating the punch and causing the printing wheel to make an impression upon the card, but movement of the rack-bar 167 is stopped and the link merely rocks on its pivot and the lug-bearing 166.

It will be understood that each one of the radial recesses in the disk 184 corresponds to a type on the type wheel and to a vertical point in such a vertical row of points of such a card as is indicated in Figures 13 and 14.

Preferably at one corner the cards used in my machine are diagonally cut across, this diagonal edge being adapted to fit a corresponding surface in the bottom of the card slot, whereby the card is brought into alinement and kept in proper position. These cards are provided with variously designated columns, each comprising in the present instance, four vertical rows of printed numerals, running from 0 at the top to 9 at the bottom, these numerals indicating points which will be opposite the correspondingly arranged and spaced punches of the time-controlled and selectively controlled mechanisms, or opposite a given position of the punches shown in Figures 15 and 17, and certain of which points will be punched in the operation of the machine, as explained.

Considering now the use of time controlled part of my machine, a card like that shown in Figure 13, whose numerals correspond in arrangement to the various punches appropriated to the time controlled mechanism, is placed within the card slot marked 186, and the lever 47 operated. Supposing that the time according to the clock-work was approximately 9:45 when this operation took place, the operation of the handle would first cause the justifying means to set all of the printing wheels so that they would then print at the top of the card in the column marked "Started," the characters 0945. At the same time the zero punch of the first vertical row of punches would perforate the first, zero, or top point of the first vertical row of numerals in the column. The 9 or lowermost punch of the second vertical row of punches would perforate the 9 or lowermost point of the second vertical row of the column, the fifth punch of the third vertical row of punches would perforate the fifth point of the third vertical row of the column, counting from the top; and the sixth punch of the fourth vertical row of punches would perforate the sixth point of the fourth vertical row of the column. Thus a record is punched in the column, to the same effect as that printed at the top of the column, it being understood that the printing and punching mechanisms are so adjusted and related that this correspondence obtains when a card having appropriately arranged printing spaces, and columns of punch-positions, is subjected to the action of the machine.

In order to produce upon the card a record of time later than that first recorded, the card is placed in the slot marked 187, whereby the columns of punch positions marked "Finished" are presented to the time punches, and upon operation of the handle 47 the time at which the operation takes place is punched in these columns and printed at the top thereof in the same manner as the starting time is recorded.

Supposing that a master card has at the same time been employed in the slot 84, and that this master card is punched, say in the column marked "Order number," after the manner already described with reference to the time punches and printing wheels, a printed and punched record corresponding to the perforations of the master card will be produced upon the first card in a manner already explained, by the punches and printing wheels whose operation is selectively determined by the master card. Of course, the card would be provided with column designations, printing spaces, and punch positions properly disposed, so that the record of the master card may be intelligibly reproduced.

It will be understood that both the devices shown in Figures 15 and 17 may be employed to take the place of the time controlled mechanism as shown in Figure 3 for instance. That is to say, I may provide a series of punches and printing wheel devices like those shown in Figures 15 and 17, arranged side by side, one in lieu of each of the vertical rows of punches, shown in Figure 3. Of course, the shafts 145 or 185 of the respective devices would be appropriately connected to the various clock-work shafts, in some such manner as described with reference to Figure 3.

I desire it understood that I do not limit my claims to the details of construction shown, in which I have simply illustrated one way of embodying the creative part or conception of the invention in concrete form in a structure or machine. The described devices are simply embodiments of the invention which other structures might embody, and some of the parts, as also combinations of parts, might well be used without the others in different types of such machines, without departure from the purview of my invention, and I regard myself as entitled to such variations from the shown and described devices as fall within the scope of my invention as expressed in the claims. It is also to be understood that materials, sizes, and relativities of parts are unimportant, except as they are specified in the claims.

Having thus described my invention what I claim as new and desire to secure by Letters Patent is:

1. In a device of the kind described, time controlled means for producing a record upon a card, and selectively controlled means whose operation is determined by the perforation characteristics of a master card for producing another record upon the card and mechanical connections whereby the operation of one of said means is dependent upon that of the other.

2. In a device of the kind described, time controlled means for producing a record upon a card, and selectively controlled means whose operation is determined by the perforation characteristics of a master card for simultaneously producing another record upon the card, and mechanical connections whereby the operation of one of said means is dependent upon that of the other.

3. In a device of the kind described, time controlled means for printing upon a card or the like, means for simultaneously perforating the card, and means whose operation is selectively determined simultaneously for printing upon the card and mechanical connections whereby the operation of one of said means is dependent upon that of the other.

4. In a device of the kind described, means for printing upon a card, means for simultaneously perforating the card, a master card and means whose operation is selectively determined by characteristics of the master card for printing upon the first card and mechanical connections whereby the operation of one of said means is dependent upon that of the others.

5. In a device of the kind described, means for printing upon a card, co-ordinate means for simultaneously perforating the card, and co-operating mechanically selective means for simultaneously making a record upon the card and mechanical connections whereby the operation of one of said means is dependent upon that of the others.

6. In a device of the kind described, means for printing upon a card, co-ordinate means for simultaneously perforating the card, and co-operating mechanically selective means for simultaneously perforating the card and mechanical connections whereby the operation of one of said means is dependent upon that of the others.

7. In a device of the kind described, means for printing upon a card, co-ordinate means for simultaneously perforating the card, means whose operation is selectively determined for simultaneously perforating the card, and mechanical connections whereby the operation of one of said means is dependent upon that of the others.

8. In a device of the kind described, time controlled means for perforating a card, means whose operation is selectively determined for perforating the card, said means acting simultaneously, and mechanical connections whereby the operation of one of said means is dependent upon that of the others.

9. In a device of the kind described, time controlled means for printing upon a card, co-ordinate time controlled means for perforating the card, co-operating mechanically selective means for printing upon the card, and means co-ordinate with said last named means for perforating the card, and mechanical connections whereby the operation of one of said means is dependent upon that of the others.

10. In a device of the kind described, time controlled means for printing upon a card, co-ordinate time controlled means for perforating the card, co-operating mechanically selective means for printing upon the card, and means co-ordinate with said last named means for perforating the card in accordance with the perforation characteristics of a master card, and mechanical connections whereby the operation of one of said means is dependent upon that of the others.

11. In a device of the kind described, means adapted to support a card in either of two different positions, means for printing upon the card, and co-operating time controlled means adapted to perforate the card when the same is in either of its two positions, and mechanical connections whereby the operation of one of said means is dependent upon that of the others.

12. In a device of the kind described, means adapted to support a card in either one of two different positions, time controlled means for printing upon the card in either one of its two positions, and co-operating time controlled means for perforating the card in either one of its two positions, and mechanical connections whereby the operation of one of said means is dependent upon that of the others.

13. In a device of the kind described, means adapted to support a card in either one of two different positions, time controlled means for printing upon the card in either one of its two positions, and co-ordinate time controlled means for perforating the card in either one of its two positions, and mechanical connections whereby the operation of one of said means is dependent upon that of the others.

14. In a device of the kind described, means for supporting a card in either one of two different positions, time controlled means for changing the physical characteristics of the card, while the same is in either one of its two positions, and co-operative means for further changing the physical characteristics of the card, the operation of said last named means being selectively determined, and mechanical connections whereby the operation of one of said means is dependent upon that of the others.

15. In a device of the kind described, means for supporting a card in either one of two different positions, time controlled means for producing a record upon the card while the same is in either one of its two positions, and co-operating mechanically selective means for perforating the card, and mechanical connections whereby the operation of one of said means is dependent upon that of the others.

16. In a device of the kind described, means for supporting a card in either one of two different positions, time controlled means for selectively printing upon and perforating the card, while it is in either one of its two positions, and co-operative selectively operated means for changing the physical characteristics of the card, and mechanical connections whereby the operation of one of said means is dependent upon that of the others.

17. In a device of the kind described, means for supporting a card in either one of two positions, time controlled means for simultaneously printing upon and perforating the card, and selectively operated means for simultaneously printing upon and perforating the card, and mechanical connections whereby the operation of one of said means is dependent upon that of the others.

18. In a device of the kind described, means for supporting a card in either one of two different positions, time controlled co-ordinate means for simultaneously printing upon and perforating the card while it is in either one of its two positions, and selectively operated co-ordinate means for simultaneously printing upon and perforating the card, and mechanical connections whereby the operation of one of said means is dependent upon that of the others.

19. In a device of the kind described, time controlled means for changing the physical characteristics of a card, selectively controlled means for further changing the physical characteristics of the card, mechanical connections whereby the operation of one of said means is dependent upon that of the other, and a single means for operating said time controlled and selectively controlled means.

20. In a device of the kind described, time controlled means for printing upon a card, coordinate means for perforating the card, co-operating selectively controlled means for printing upon the card, mechanical connections whereby the operation of one of said means is dependent upon the operation of the others, and means co-ordinate with said last named means for simultaneously perforating the card.

21. In a device of the kind described, time controlled means for printing upon a card, co-ordinate means for perforating the card, selectively controlled means for perforating the card, and means co-ordinate with said last named means for printing upon the card, and a single means for actuating all of said means, and mechanical connections whereby the operation of one of said means is dependent upon the operation of the others.

22. In a device of the kind described, time controlled means for printing upon a card, time controlled means for perforating the card, justifying means, selectively controlled means for printing upon the card, and a single operating means for all of the means previously mentioned, and mechanical connections whereby the operation of one of said means is dependent upon the operation of the others.

23. In a device of the kind described, a punch, a die cooperating therewith, clock work, secondary shafts, clutches connecting the secondary shafts with the shafts of the clock work printing wheels, mechanical connections connecting the printing wheels with said secondary shafts, justifying means upon said secondary shafts, a member disposed for engaging said justifying wheels, a manually operable lever, and mechanical connections controlled thereby for moving said member to operate the justifying means and for thereafter at the same operation moving the die into operative engagement with the punch.

24. In a device of the kind described, clock work having shafts, secondary shafts clutch connected to shafts of the clock work, justifying wheels upon said secondary shafts, a moving frame engaging said justifying wheels, a printing wheel shaft, printing wheels thereon having operative connection with said secondary shafts respectively, a punch corresponding to each one of said secondary shafts, whose operation is determined by that of the secondary shaft, a die member for each of said punches, and means for first moving said moving frame and then moving said die members.

25. In a device of the kind described, clock work having shafts, secondary shafts clutch connected to shafts of the clock work, justifying wheels upon said secondary shafts, a moving frame engaging said justifying wheels, sprocket wheels upon one of said second shafts, sprocket wheels upon the other secondary shafts cooperating with the first, belts passing over said sprocket wheels, anvils carried by said belts, punch members corresponding to the several secondary shafts and having operative relation with the anvils upon said belts, dies for said punches, means for first moving said moving frame and then moving the dies.

26. In a device of the kind described, clock work having shafts, secondary shafts clutch connected to shafts of the clock work, printing wheels whose operation is determined by that of the secondary shafts, justifying wheels upon the secondary shafts, punches corresponding to the several secondary shafts, dies cooperative with said punches, means for operating the justifying wheels and then bringing about the cooperative relation between the dies and punches, and selectively controlled recording means operated by said last named means.

27. In a device of the kind described, clock work having shafts, secondary shafts clutch connected to shafts of the clock work, justifying wheels upon said secondary shafts and a movable frame engaging said justifying wheels, printing wheels having operative relation to the several secondary shafts, punches coordinated with said printing wheels, dies for said punches, means for moving said movable frame and then moving said dies, selectively controlled printing instrumentalities and selectively controlled perforating means operated by said last named means.

28. In a device of the kind described, clock work having shafts, secondary shafts clutch connected to shafts of the clock work, justifying wheels upon said secondary shafts, a movable frame adapted to engage said justifying wheels, printing wheels cooperative with the several secondary shafts, punches, whose operation is determined by the movements of said printing wheels, dies cooperating with said punches, means for moving the movable frame and then bringing the dies and punches together, selector means operated by said last named means, and recording means operated by said selectors.

29. In a device of the kind described, time controlled recording means, a plurality of other recording means, selectors for determining the operation of said last named recording means, and means for operating said last named recording means from said first named recording means, and mechanical connections whereby the operation of one of said means is dependent upon the operation of the others.

In testimony whereof I have hereunto affixed my signature in the presence of two witnesses.

PERCY L. HILL.

Witnesses:
 FRANK J. KENT,
 M. A. BUSCHER.